US008473927B2

(12) United States Patent
Li et al.

(10) Patent No.: US 8,473,927 B2
(45) Date of Patent: Jun. 25, 2013

(54) POINTS-TO ANALYSIS USING VALUE FLOW

(75) Inventors: Lian Li, Carindale (AU); Cristina N. Cifuentes, Brisbane (AU); Nathan Robert Albert Keynes, Kuraby (AU)

(73) Assignee: Oracle International Corporation, Redwood Shores, CA (US)

( * ) Notice: Subject to any disclaimer, the term of this patent is extended or adjusted under 35 U.S.C. 154(b) by 216 days.

(21) Appl. No.: 13/117,058

(22) Filed: May 26, 2011

(65) Prior Publication Data

US 2012/0304158 A1 Nov. 29, 2012

(51) Int. Cl.
*G06F 9/44* (2006.01)
*G06F 9/45* (2006.01)

(52) U.S. Cl.
USPC ............ 717/132; 717/131; 717/155; 717/156

(58) Field of Classification Search
USPC .................. 717/131–133, 155–157
See application file for complete search history.

(56) References Cited

U.S. PATENT DOCUMENTS

| | | | |
|---|---|---|---|
| 6,202,202 B1* | 3/2001 | Steensgaard | 717/127 |
| 7,003,760 B1* | 2/2006 | Das | 717/124 |
| 7,496,894 B2* | 2/2009 | Das | 717/124 |
| 8,141,049 B2* | 3/2012 | Kahlon | 717/126 |
| 2004/0243980 A1* | 12/2004 | Das | 717/124 |
| 2008/0229286 A1* | 9/2008 | Kahlon | 717/126 |

OTHER PUBLICATIONS

Hasti et al., "Using Static Single Assignment Form to Improve Flow-Insensitive Pointer Analysis," 1998, ACM, p. 1-9.*
Hind et al., "Assessing the Effects of Flow-Sensitivity on Pointer Alias Analyses," 1998, Springer-Verlag, p. 57-81.*
Yu et al., "Level by Level: Making Flow- and Context-Sensitive Pointer Analysis Scalable for Millions of Lines of Code," Apr. 2010, ACM.*
Andersen, L. O., "Program Analysis and Specialization for the C Programming Language," Ph.D. Thesis, University of Copenhagen, Diku, May 1994, 43 pages.
Whaley, J. and Lam, M. S., "Cloning-Based Context-Sensitive Pointer Alias Analysis Using Binary Decision Diagrams," Conference on Programming Language Design and Implementation (PLDI), Jun. 2004, 14 pages.
Lhotak, O. and Hendren, L., "Context-Sensitive Points-To Analysis: Is It Worth It?" ACM Transactions on Software Engineering and Methodology (TOESM), vol. 18, Issue No. 1, Sep. 2008, 16 pages.

(Continued)

*Primary Examiner* — Wei Zhen
*Assistant Examiner* — Qing Chen
(74) *Attorney, Agent, or Firm* — Osha Liang LLP

(57) ABSTRACT

In general, in one aspect, the invention relates to a method for performing points-to analysis by generating a value flow graph for source code. The method steps include: initializing the value flow graph including a set of memory objects and a set of edges based on Base and Assignment instructions, where the set of edges represents inclusion constraints between the set of memory objects and a set of pointer variables; determining a pointed-to-by set including at least one pointer variable of the set of pointer variables; updating the value flow graph by introducing a flow edge based on an indirect reference, where the flow edge is related to a memory object of the set of memory objects that is added to a working list; updating the pointed-to-by set based on the memory object in the working list; and analyzing the source code using the pointed-to-by set.

19 Claims, 13 Drawing Sheets

OTHER PUBLICATIONS

Milanova, A. et al., "Parameterized Object Sensitivity for Points-To Analysis for Java," ACM Transactions on Software Engineering and Methodology (TOSEM), vol. 14, Issue No. 1, Jan. 2005, 41 pages.

Hardekopf, B. and Lin, C., "Semi-Sparse Flow-Sensitive Pointer Analysis," Symposium on Principles of Programming Languages (POPL), Jan. 2009, 13 pages.

Kahlon, V., "Bootstrapping: A Technique for Scalable Flow and Context-Sensitive Pointer Alias Analysis," Conference on Programming Language Design and Implementation (PLDI), Jun. 2008, 10 pages.

Livshits, V. B. and Lam, M. S., "Tracking Pointers with Path and Context Sensitivity for Bug Detection in C Programs," ESEC/FSE, Sep. 2003, 10 pages.

Yu, Hongtao et al., "Level by Level: Making Flow- and Context-Sensitive Pointer Analysis Scalable for Millions of Lines of Code," International Symposium on Code Generation and Optimization (CGO), Apr. 2010, 12 pages.

Hardekopf, B. and Lin, C., "The Ant and the Grasshopper: Fast and Accurate Pointer Analysis for Millions of Lines of Code," Conference on Programming Design and Implementation (PLDI), Jun. 2007, 10 pages.

Sridharan, M. and Bodik, R., "Refinement-Based Context-Sensitive Points-To Analysis for Java," Conference on Programming Language Design and Implementation (PLDI), Jun. 2006, 15 pages.

Bravenboer, M., and Smaragdakis, Y., "Strictly Declarative Specification of Sophisticated Points-To Analyses," Conference on Object-Oriented Programming, Systems, Languages, and Applications (OOPSLA), Oct. 2009, 19 pages.

* cited by examiner

```
main() {
    char A[. . . ], B[. . . ];
    char *a, *b, **t1, **t2;
    t1=&a;
    t2=&b;
    a=&A;
    b=&B;
    if(. . . )
        *a='A';
    else{
        swap(t1, t2);
        *a='B';
    }
    *a = ' ?';
} void swap (void *p, void *q){
    void tmp = *p;
    *p = *q;
    *q = tmp;
}
```

FIG. 5A

POINTS-TO ANALYSIS USING VALUE FLOW

BACKGROUND

Points-to analysis is a static analysis that models dynamic memory behavior by computing the points-to set for each pointer variable (i.e., the set of memory objects (storage locations) that a pointer variable can point to). Pointer information is a prerequisite for most program analyses for C-like languages, including compiler optimizations, program comprehension, and error checking. The precision and performance of the client analyses depend heavily on the precision of the pointer information provided.

Typically, it is sufficient for pointer analyses to analyze only the four types of instructions shown below in TABLE 1. A Base instruction sets the value stored in a pointer variable to the address of a memory object (e.g., pointer=&object). An Assignment instruction sets the value stored in a pointer variable to the value stored in another pointer variable (e.g., the statement pointer1=pointer2 where both pointer1 and pointer2 are pointer variables). A Store instruction is a statement that stores the value of a pointer variable to the memory address of a de-referenced pointer variable (e.g., *pointer1=pointer2), and a Load instruction is a statement that loads the memory address of a pointer variable into another pointer variable (e.g., pointer1=*pointer2).

TABLE 1

| Instruction | Type |
| --- | --- |
| a = &b | Base |
| a = b | Assignment |
| *x = b | Indirect |
| a = *y | (Load and Store) |

Nested pointer dereferences may be eliminated by introducing auxiliary variables. Data aggregates, such as arrays and structs, are regarded as monolithic objects, where heap objects may be modeled by regarding the allocation site as a special memory object. Function calls and returns may be translated to a set of Assign instructions between function arguments (returns) and parameters. Without loss of generality, we assume that if a memory object A is accessed via Load and Store instructions only: a unique pointer variable pA may be introduced to take its address (via Base instruction pA=&A) and Memory Object A may be accessed via Load and Store instructions with pA as the target (i.e., A=pointer1 is translated into pA=&A, *pA=pointer1).

Most existing points-to analyses are based on Andersen's formulation, which does not consider flow-sensitivity (i.e., respecting control flow dependencies) and context-sensitivity (i.e., respecting the semantics of function calls). Andersen's formulation computes the points-to set of all pointer variables by solving a set of inclusion constraints generated from program code. In practice, the constraints are effectively solved by computing a dynamic transitive closure of a constraint graph, with nodes to represent pointer variables and memory objects, and edges to represent inclusion constraints between the pointer variables and memory objects. Indirect references are more complex and are handled by processing the points-to set for each node in the graph, where the points-to set is gathered by computing the transitive closure of the graph. As more points-to information is computed, new edges are introduced to the constraint graph to represent constraints introduced via indirect references; thus, the transitive closure and the points-to information should be updated. In this case, the algorithm terminates when no new points-to information can be updated.

SUMMARY

In general, in one aspect, the invention relates to a method for performing points-to analysis by generating a value flow graph for source code. The method steps include: initializing the value flow graph including a set of memory objects and a set of edges based on Base and Assignment instructions, where the set of edges represents inclusion constraints between the set of memory objects and a set of pointer variables; determining a pointed-to-by set including at least one pointer variable of the set of pointer variables that are reachable from one of the set of memory objects; updating the value flow graph by introducing a flow edge based on an indirect reference, where the flow edge is related to a memory object of the set of memory objects that is added to a working list; updating the pointed-to-by set based on the memory object in the working list; and analyzing the source code using the pointed-to-by set.

In general, in one aspect, the invention relates to a system for performing points-to analysis by generating a value flow graph for source code. This system includes: at least one processor; a direct reference module configured to be executed on the at least one processor, the direct reference module when executed causing the processor to: initialize the value flow graph including a set of memory objects and a set of edges based on Base and Assignment instructions, where the set of edges represents inclusion constraints between the set of memory objects and a set of pointer variables; and determine a pointed-to-by set including at least one of the set of pointer variables that are reachable from one of the set of memory objects; an indirect reference module configured to be executed on the at least one processor, the indirect reference module when executed causing the processor to: update the value flow graph by introducing a flow edge based on an indirect reference, where the flow edge is related to a memory object of the set of memory objects; update the pointed-to-by set based on the flow edge; and determining a points-to set including the memory object using the pointed-to-by set, where the points-to set includes all memory objects that may be pointed to by the at least one of the set of pointer variables; and an analysis module configured to be executed on the at least one processor, the analysis module when executed causing the processor to perform analysis of the source code using the points-to set.

In general, in one aspect, the invention relates to a non-transitory computer readable medium storing instructions for performing points-to analysis by generating a value flow graph for source code. The instructions include functionality to: initialize the value flow graph including a set of memory objects and a set of edges based on Base and Assignment instructions, where the set of edges represents inclusion constraints between the set of memory objects and a set of pointer variables; determine a pointed-to-by set including at least one of the set of pointer variables that are reachable from one of the set of memory objects; determine that a Store instruction and a Load instruction of an indirect reference both refer to the at least one of the set of pointer variables; update the value flow graph by introducing a flow edge from the Store instruction to the Load instruction, where the flow edge is related to a memory object of the set of memory objects that is added to a working list; update the pointed-to-by set based on the memory object; and analyze the source code using the pointed-to-by set.

Other aspects and advantages of the invention will be apparent from the following description and the appended claims.

BRIEF DESCRIPTION OF DRAWINGS

FIGS. 5A-F show an example in accordance with one or more embodiments of the invention.

DETAILED DESCRIPTION

Figure 1:
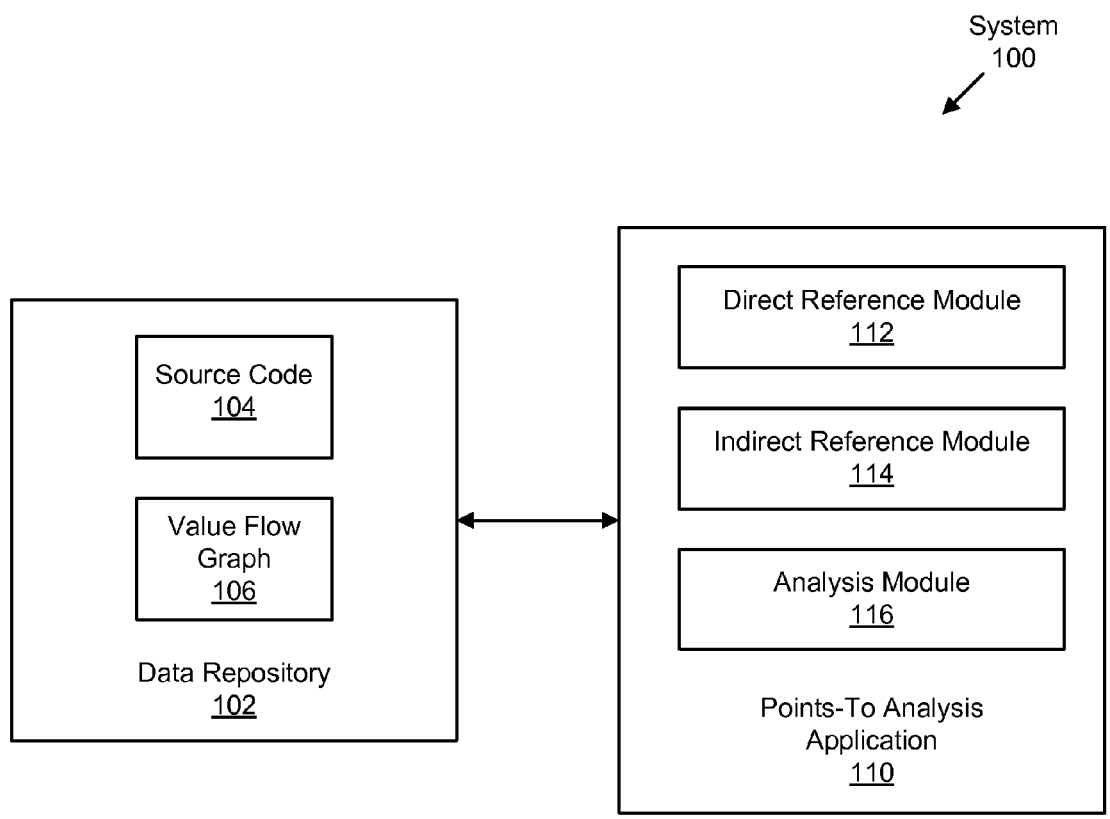
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for points-to analysis as value flow. Specifically, in one or more embodiments of the invention, the method analyzes source code to generate a value flow graph for determining points-to sets of pointer variables. The points-to sets and pointed-to-by sets are generated while updating the value flow graph with direct and indirect references of the source code. A points-to set for a pointer variable includes all the memory objects that may be pointed to by the pointer variable. The pointed-to-by set of a memory object is the set of pointer variables that may point to the memory object.

In the value flow graph, nodes represent memory objects and pointer variables, with memory objects being source nodes with no incoming edge, and edges represent dependencies between the memory objects and pointer variables. The points-to set of each pointer variable is the set of memory objects that can reach the pointer variable in the value flow graph.

FIG. 1 shows a diagram of a system in accordance with one or more embodiments of the invention. As shown in FIG. 1, System (100) includes a Data Repository (102), Source Code (104), a Value Flow Graph (106), a Points-To Analysis Application (110), a Direct Reference Module (112), an Indirect Reference Module (114), an Analysis Module (116). Each of the aforementioned components of FIG. 1 is discussed below.

The Data Repository (102) may be any device capable of storing data (e.g., computer, server, hard drive, memory, flash drive, etc). The Data Repository (102) may store software applications, code files, or any other type of data. In one or more embodiments of the invention, the Points-To Analysis Application (110) may reside on the same device as the Data Repository (102). Alternatively, the Points-To Analysis Application (110) may reside at a different location.

In one or more embodiments of the invention, the Source Code (104) is stored in the Data Repository (102). The Source Code (104) may be in a variety of programming languages (e.g., C, C++, Java, Python, etc), and may be for any type of program. In one example, all of the Source Code (104) may be retrieved from the Data Repository (102) for analysis. In another example, a portion of the Source Code (104) may be retrieved from the Data Repository (102) for analysis. One of ordinary skill in the art will recognize that any amount of code may be analyzed and, as such, the invention should not be limited to the above examples. In one or more embodiments of the invention, the output of an analysis of the Source Code (104) may be a Value Flow Graph (106). The Value Flow Graph (106) may represent how memory objects flow to pointer variables, where a pointer variable is a reference to a memory address storing a memory object.

In one or more embodiments of the invention, the Points-To Analysis Application (110) includes a Direct Reference Module (112), an Indirect Reference Module (114), and an Analysis Module (116). The Points-To Analysis Application (110) may be, for example, a software application or module that includes instructions for performing points-to analysis on program code. Points-to analysis is a static analysis that determines which pointer variables can point to which memory objects.

In one or more embodiments of the invention, the Direct Reference Module (112) is a software module configured to initialize a value flow graph based on direct references in the Source Code (104). Specifically, the Direct Reference Module (112) may be configured to initialize the value flow graph with nodes representing memory objects and pointer variables, where the memory object nodes have no incoming edges and the edges of the value flow graph represent direct references (i.e., dependencies introduced via Base and Assign instructions) between the memory objects and pointer variables. In one or more embodiments of the invention, the Direct Reference Module (112) is further configured to determine a pointed-to-by set for each memory object. The pointed-to-by set of a memory object is the set of pointer variables that may point to the memory object. More specifically, the Direct Reference Module (112) may be configured to determine pointed-to-by sets by performing a depth first traversal of the value flow graph. During the depth first traversal, the Direct Reference Module (112) is also configured to update the points-to set of each pointer variable.

In one or more embodiments of the invention, the Indirect Reference Module (114) is a software module configured to update a value flow graph by introducing flow edges based on indirect references. In this case, an indirect reference is a reference involving a pointer dereference (e.g., *p, where p is a pointer variable). A pointer dereference of a pointer variable accesses the memory object to which the pointer points. The Indirect Reference Module (114) may be further configured to update the pointed-to-by sets using the flow edges.

In one or more embodiments of the invention, the Indirect Reference Module (114) is further configured to determine and/or update a points-to set for each pointer variable using the pointed-to-by sets. A points-to set for a pointer variable includes all the memory objects that may be pointed to by the pointer variable. In one or more embodiments of the invention, the Indirect Reference Module (114) is further configured to determine an escape set for each pointer variable. An escape set for a pointer variable includes the set of objects to which the pointer variable escapes.

In one or more embodiments of the invention, the Analysis Module (116) is configured to perform program analysis of the Source Code (104) using the pointed-to-by sets and/or points-to sets. Program analysis may include, but is not limited to, compiler optimizations, program comprehension, and error checking. For example, the Analysis Module (116) may use the points-to sets to identify null pointer exceptions in the Source Code (104).

Figure 2:
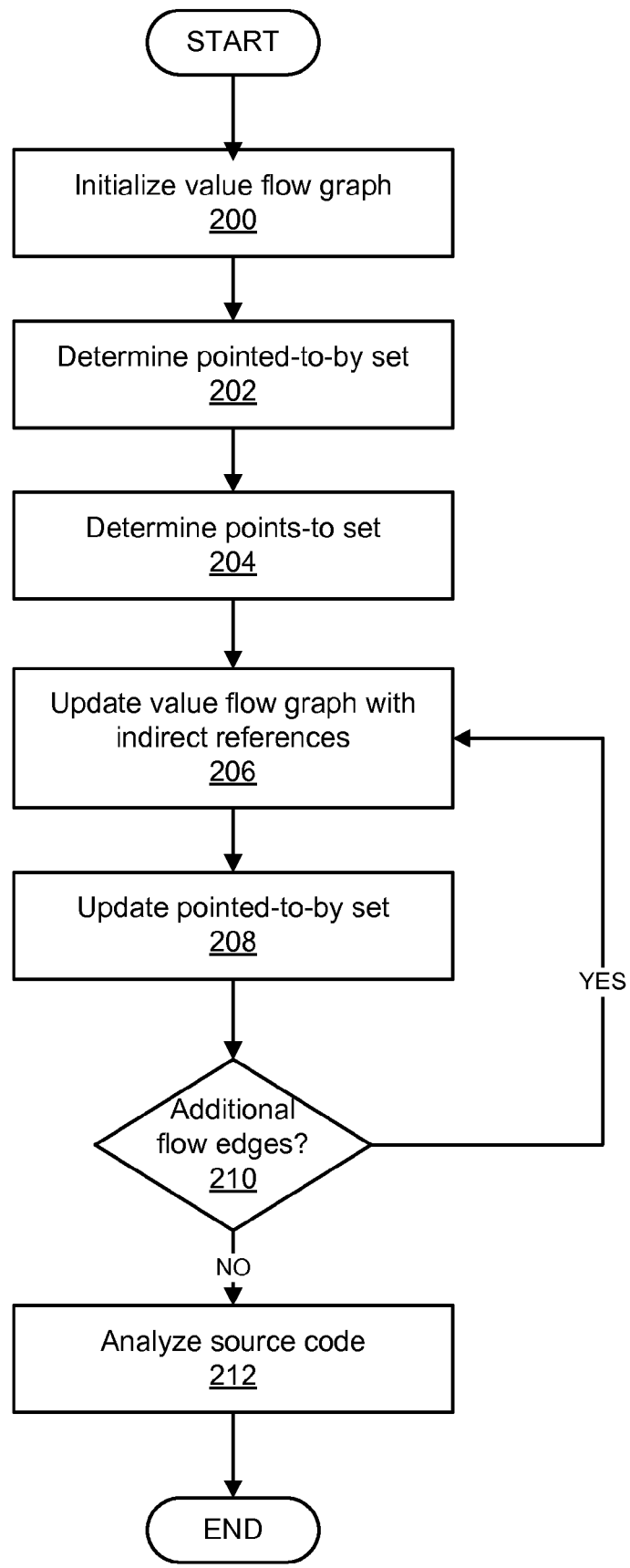
FIG. 2 shows a flowchart of a method in accordance with one or more embodiments of the invention.

FIG. 2 shows a flowchart of a method for generating a value flow graph in accordance with one or more embodiments of the invention. The method of FIG. 2 may be implemented, for example, using the system of FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 200, a value flow graph is initialized. The value flow graph may be initialized by performing an analysis of the source code, where the nodes of the value flow graph are pointer variables and memory objects in the source code. Each of the memory objects in the value flow graph may have no incoming edges, where the edges of the value flow graph represent how the memory objects flow to the pointer variables. In one or more embodiments of the invention, the value flow graph is initialized using the Base and Assignment instructions of the source code.

In addition, a worklist of memory objects may be initialized including all of the memory objects in the value flow graph. Each memory object in the worklist may then be processed as discussed below in Steps 202-210.

In Step 202, a pointed-to-by set is determined using the value flow graph. More specifically, a depth first traversal of the value flow graph may be performed to generate a pointed-to-by set for each of the memory objects in the value flow graph. For example, a depth first traversal may be performed from each of the memory objects, where pointer variables traversed are added to the pointed-to-by set for the memory object. A depth first traversal is an algorithm for traversing a graph starting at a source node (i.e., a node with no incoming edges) of the graph, where each branch of the graph is explored to the full extent of the branch before backtracking. In this example, each memory object of the value flow graph may be a source node where a depth first traversal is initiated.

In Step 204, a points-to set is determined. Specifically, a points-to set may be determined for each of the pointer variables based on the pointed-to-by sets determined in Step 202. For example, the points-to set of each pointer variable may also be updated during the depth first traversal performed in Step 202. In this example, the points-to set of each pointer variable in the pointed-to-by set is updated to include the memory object associated with the pointed-to-by set.

In Step 206, the value flow graph is updated with indirect references. An indirect reference is a reference involving a pointer dereference, which provides access to the memory address pointed to by a pointer variable. A flow edge may be added to the value flow graph for each indirect reference in the source code. In this case, the flow edge is from a Store instruction to a Load instruction, and the flow edge is added to the value flow graph if the Store instruction and Load instruction refer to pointer variables in the pointed-to-by set. As discussed above, a Store instruction is a statement that stores a value at the memory address of a dereferenced pointer variable, and a Load instruction is a statement that loads the memory address of a pointer variable into another pointer variable. For each flow edge added to the value flow graph, the worklist is updated to include a memory object related to the flow edge.

Examples of Base, Assignment, and Indirect instructions are shown below in TABLE 2, which summarizes how values flow between pointer variables. Values can flow from one node to another directly via Base and Assignment instructions, or indirectly via Load and Store instructions. A Store instruction (the pointer variable stored to in the Store instruction) can flow to a Load instruction if both can refer to the same memory object. By default, we assume a memory object is referenced via Load and Store instructions; thus, a reference to memory object v is replaced as *&v (e.g., instruction x=v is transformed to x=*&v if v is a memory object).

TABLE 2

| Instruction | Type | Value Flow |
|---|---|---|
| a = &b | Base | loc(b) -> a |
| a = b | Assignment | b -> a |
| *x = b | Indirect (Load and Store) | b -> a if ∃o\|loc(o) → x∧loc(o) → y |
| a = *y | | |

In Step 208, the pointed-to-by set is updated. Specifically, the pointed-to-by set is updated to include the memory object associated with the flow edge added in Step 206. For example, the pointed-to-by set for the memory object may be updated as described above in Step 202. Once the pointed-to-by set is updated, the points-to sets may also be updated based on the updates to the pointed-to-by set.

In Step 210, a determination is made as to whether there are additional flow edges to be added to the value flow graph. The generation of the pointed-to-by sets and points-to sets is complete when no new flow edges can be introduced into the value flow graph, resulting in the points-to set for each pointer variable and the pointed-to-by set for each memory object. If there are additional flow edges to be added, the process proceeds to Step 206. If there are no additional flow edges to be added, the process proceeds to Step 212.

In Step 212, the source code may be analyzed using the point-to sets and/or the pointed-to-by sets. Specifically, compiler optimizations, program comprehension, and/or error checking may be performed on the source code using the point-to sets. For example, the point-to sets may be used to identify null pointer exceptions or buffer overflows in the source code (e.g., using the points-to sets to analyze the flow of memory objects to a pointer variable to determine if the pointer variable is null at a point execution). In another example, the points-to set may be used to perform compiler optimizations such as, but not limited to, instruction scheduling, redundancy elimination, and speculative parallelization.

An example algorithm for generating a value flow graph as discussed above with respect to FIG. 2 is shown in TABLE 3.

TABLE 3

```
procedure COMPUTEVALFLOW
    Let G =< V,E >
    for each statement a = &b do
        E := E ∪ {loc(b) → a}
        W := W ∪ {loc(b)}
    for each statement a = b do
        E := E ∪ {b → a}
    while W ≠ ∅ do
        Select loc(n), and remove it from W
        UpdatePtedSet(n)
        UpdateIndirectRef(n)
procedure UPDATEPTEDSET(n)
    Let V be the set of variables that are reachable from loc(n)
    pted(n) := V
    for each variable v in V do
        pts(v) := pts(v) ∪ {loc(n)}
```

TABLE 3-continued

```
procedure UPDATEINDIRECTREF(n)
    for each statement *a = x where a ∈ pted(n) do
        for each statement y = *b where b ∈ pted(n) do
            if x → y ∉ E then
                E := E ∪ {x → y}
                W := W ∪ {pts(x)}
```

In the example shown in TABLE 3 above, the UPDATEPT-EDSET procedure may correspond to Steps 202-204, and the UPDATEINDIRECTREF procedure may correspond to Steps 206-210. In the example algorithm, the value flow graph is denoted as G, the points-to set for each pointer variable is denoted as pts(v), and the pointed-to-by set for each memory object, loc(n), is denoted as pted(n).

In one or more embodiments of the invention, the example algorithm above may be implemented to be both flow-sensitive and context-sensitive. A flow-sensitive implementation respects control flow dependencies in the source code as discussed below with respect to FIG. 4. A context-sensitive implementation respects the semantics of function calls in the source code. Alternatively, the example algorithm may be implemented to be flow and context insensitive. Those skilled in the art will appreciate that a sensitive implementation of the algorithm is typically more precise and magnitudes slower than an insensitive implementation.

Figure 3A:
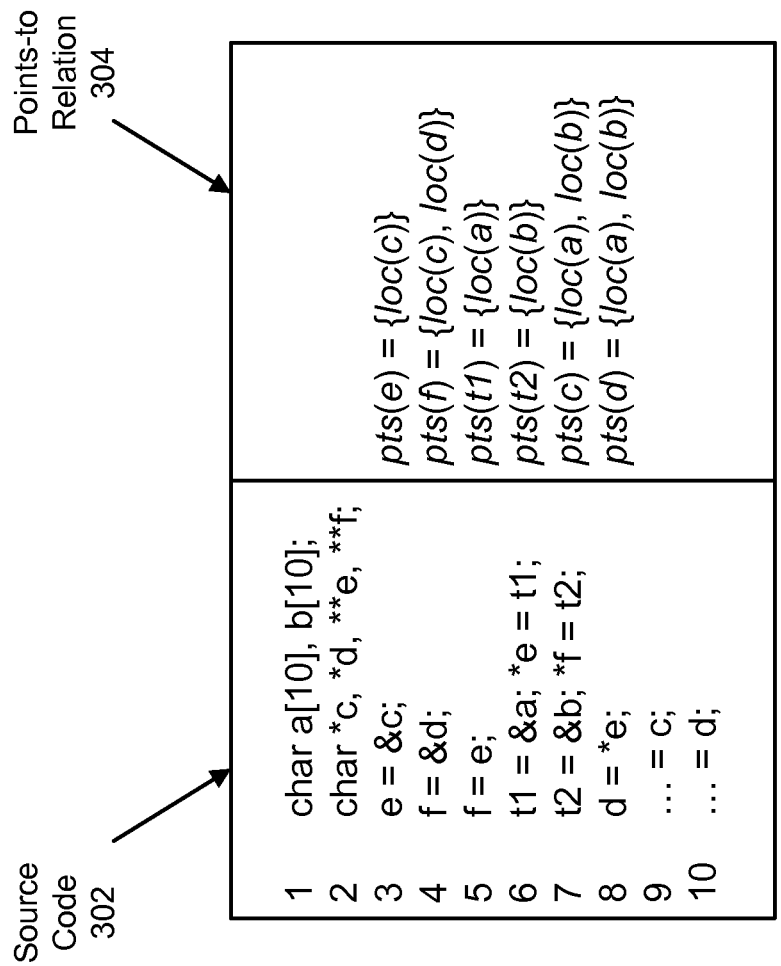
FIGS. 3A-D show an example in accordance with one or more embodiments of the invention.
Figure 3B:
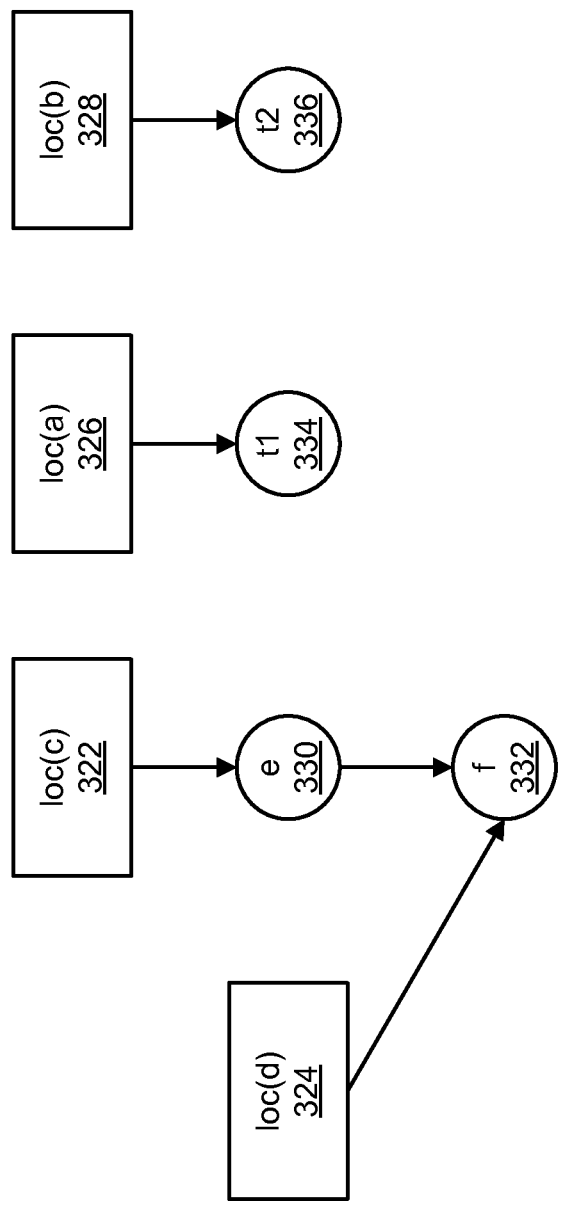
Figure 3C:
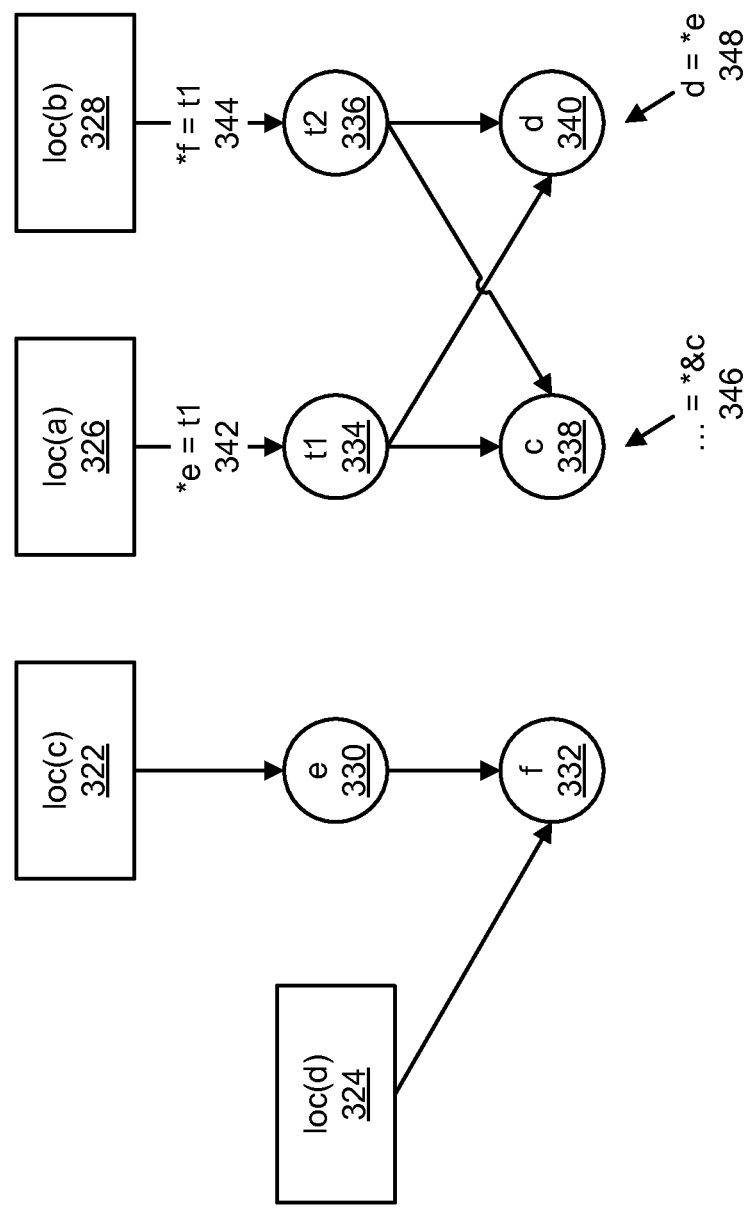
Figure 3D:
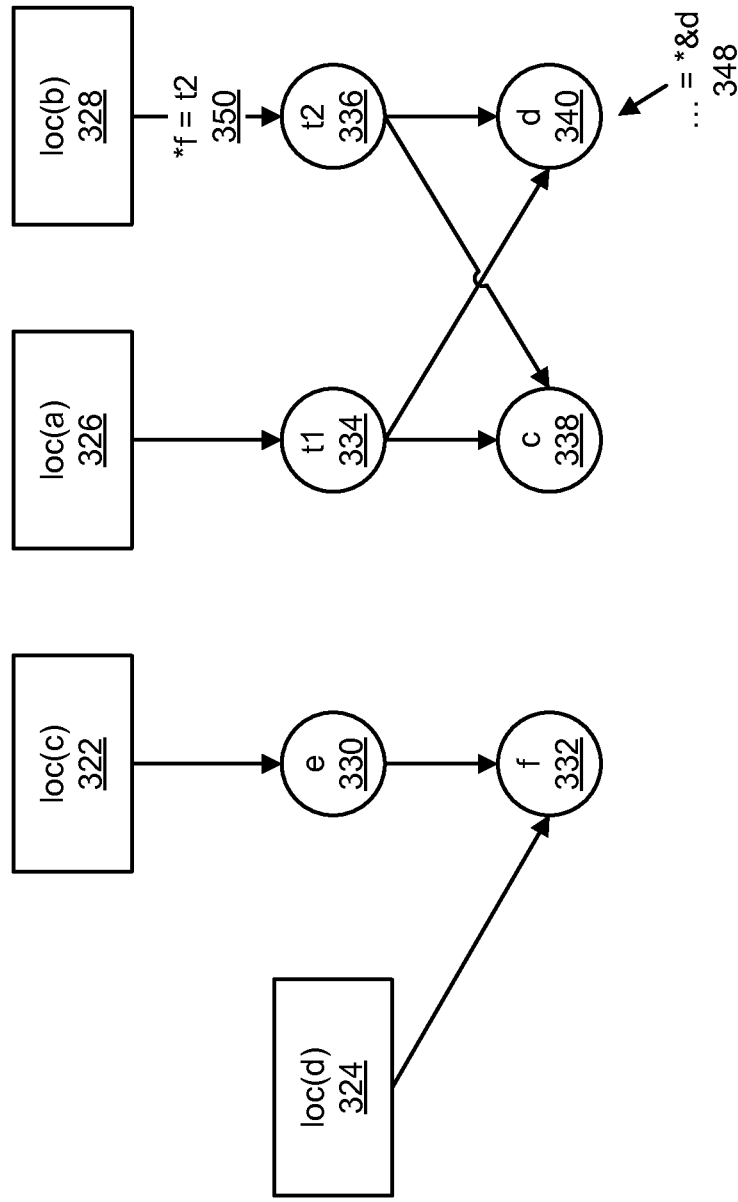

FIGS. 3A-D show examples in accordance with one or more embodiments of the invention. Specifically, the example in FIG. 3A shows a section of Source Code (302), and FIGS. 3B-D shows the generation of a value flow graph for the section of Source Code (302) in FIG. 3A. The example of FIGS. 3A-D has been simplified to aid in the understanding of the invention and, as such, the invention should not be limited to this example.

FIG. 3A shows Source Code (302) and corresponding Points-to Relation (304). For the purposes of this example, Source Code (302) contains code written in the C programming language, but the invention is not limited to the C programming language, and may be used to analyze code from any programming language. FIG. 3A also shows the points-to set for each pointer variable (e, f, t1, t2, c, and d) in the Points-to Relation (304). In general, when executed, the Source Code (302) initializes character arrays and character pointers and then executes a number of assignment, store, and Load instructions. In this example, the memory objects are loc(a), loc(b), loc(c), and loc(d); and the pointer variables are e, f, c, d, t1, and t2.

FIG. 3B shows a value flow graph generated for the Source Code (302) of FIG. 3A. For example, the value flow graph may be generated as discussed above with respect to FIG. 2. The value flow graph is initialized (Step 202 of FIG. 2) as shown in FIG. 3B. In this example, the worklist W is initialized as {loc(a) (326), loc(b) (328), loc(c) (322), loc(d) (324)}. Memory object loc(c) (322) is selected from the worklist W as the starting point of the depth first traversal (e.g., Step 202 of FIG. 2), which determines the pointed-to-by set of loc(c) (322) to be {&c, e (330), f (332)}. Further, the points-to set of pointer variable e (330) is determined (e.g., Step 204 of FIG. 2) to be {loc(c)}.

FIG. 3C shows the value flow graph with updates for indirect references (e.g., Step 206 of FIG. 2). Because {&c, e (330), f (332)} are in the same pointed-to-by set of loc(c), the Store instructions *e=t1 (342) and *f=t2 (344) are connected to the Load instruction d=*e (348) and . . . =c (346), where the connections are represented as flow edges in the updated value flow graph. In this example, the memory object loc(c) (322) is referenced via Load and Store instructions, and . . . =c (346) is transformed to . . . =*&c (346).

FIG. 3D shows the results of the processing of the next memory object selected from the worklist W, loc(d) (324). In this example, the pointed-to-by set for loc(d) (324) is {&d, f (332)}, and the points-to set for pointer variable f (332) is {loc(c) (322), loc(d) (324)}. Because no new indirect dependencies are introduced via loc(d) (324), the value flow graph remains the same as shown in FIG. 3C. At this stage, the remaining memory objects loc(a) (326) and loc(b) (328) may be iteratively processed (e.g., Steps 202-206 of FIG. 2) to generate corresponding pointed-to-by sets and points-to sets.

Those skilled in the art will appreciate that for flow-sensitive analysis, the value flow graph should respect the execution order of program instructions in computing value flows. Direct value flows via Base and Assignment instructions may first be represented in static single assignment ("SSA") with common practices and then trivially processed. Indirect value flows from Store to Load instructions cannot be directly represented in SSA. For indirect value flows, the Store and Load instructions should be checked to determine not only whether they refer to the same memory object or not, but also to determine whether the Store can reach the Load in the control flow graph ("CFG") or not. This determination is even more challenging with the strong update rule, where a Store instruction can be killed by another Store instruction and the killed Store cannot flow further to a Load.

Figure 4:
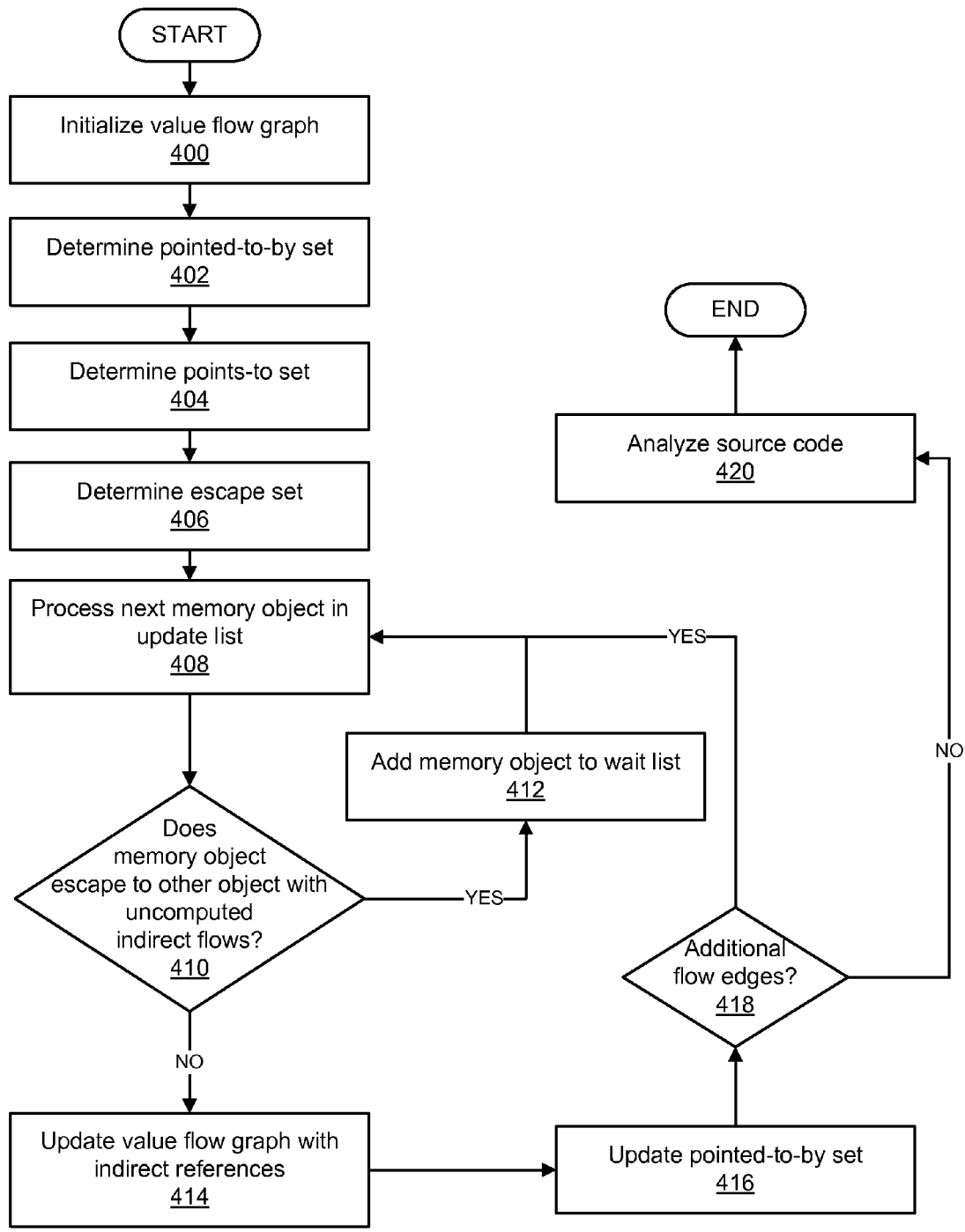
FIG. 4 shows a flowchart of a method in accordance with one or more embodiments of the invention.

FIG. 4 shows a flowchart of a flow-sensitive method for generating a value flow graph in accordance with one or more embodiments of the invention. The method of FIG. 4 may be implemented, for example, using the system of FIG. 1. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, in Step 400, a value flow graph is initialized. The value flow graph may be initialized by performing an analysis of the source code, where the nodes of the value flow graph are pointer variables and memory objects in the source code. Each of the memory objects in the value flow graph may have no incoming edges, where the edges of the value flow graph represent how the memory objects flow to the pointer variables. In one or more embodiments of the invention, the value flow graph is initialized using the Base and Assignment instructions of the source code (i.e., direct references).

In addition, a worklist of memory objects including all of the memory objects in the value flow graph and a wait list for memory objects deferred from processing (initially empty) may be initialized. Each memory object in the worklist may then be processed as discussed below in Steps 402-418.

In Step 402, a pointed-to-by set is determined using the value flow graph. More specifically, a depth first traversal of the value flow graph may be performed to generate a pointed-to-by set for each of the memory objects in the value flow graph. For example, a depth first traversal may be performed from each of the memory objects, where pointer variables traversed are added to the pointed-to-by set for the memory object. A depth first traversal is an algorithm for traversing a graph starting at a source node (i.e., a node with no incoming edges) of the graph, where each branch of the graph is explored to the full extent of the branch before backtracking. In this example, each memory object of the value flow graph may be a source node where a depth first traversal is initiated.

In Step 404, a points-to set is determined. Specifically, a points-to set may be determined for each of the pointer variables based on the pointed-to-by sets determined in Step 402. For example, the points-to set of each pointer variable may also be updated during the depth first traversal performed in Step 402. In this example, the points-to set of each pointer variable in the pointed-to-by set is updated to include the memory object associated with the pointed-to-by set.

In Step 406, an escape set is determined. The escape set of the memory object is the set of objects to which the memory object escapes. In this case, escaping refers to the set of memory objects that may be accessed by dereferencing the memory object. An example algorithm for determining an escape set is shown below in TABLE 4.

In one or more embodiments of the invention, Steps 400, 402, and 404 are the same or substantially similar to Steps 200, 202, and 204 as discussed above with respect to FIG. 2.

In Step 408, the next memory object in the worklist is processed. In other words, each of the memory objects in the worklist is processed sequentially. As discussed, the worklist is initially initialized with all the memory objects in the value flow graph, where the worklist updated during this workflow to modify the set of memory objects that should be processed. In Step 410, a determination is made as to whether the memory object escapes to another object with uncomputed indirect references.

Figure 5B:
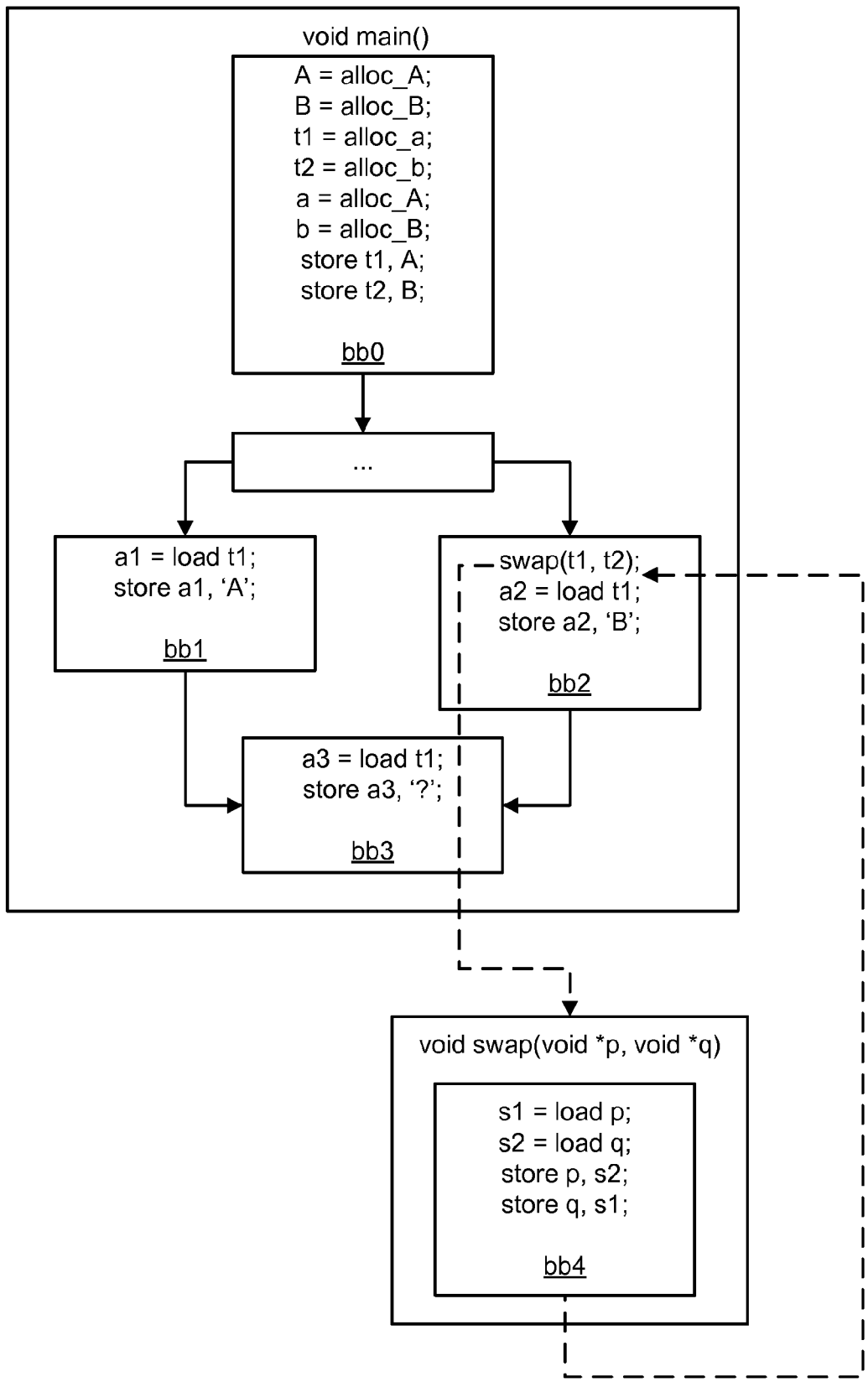

In one or more embodiments of the invention, the strong update rule is defined as: for scalar memory object alloc_o with a single memory location, the instruction (e.g., store X) will kill all previous store instructions to the object if the referring pointer variable X only points to alloc_o. For example, in FIG. 5B showing an example representation of source code, the instruction (store p, s2) in bb3 will kill all previous instructions to alloc_a (e.g., (store t1, A)) in bb0, as p only points to the scalar object alloc_a.

In one or more embodiments of the invention, a partial order relation, the escape order $\trianglelefteq$, is introduced between memory objects defined as: for two objects alloc_A and alloc_B, alloc_B escapes to alloc_A if there exists an instruction (store X, Y) such that alloc_A$\rightarrow$ X and alloc_B$\rightarrow$ Y, denoted as alloc A$\trianglelefteq$ alloc B. The escape order, based on the escape set determined in Step 406 (e.g., as show below in TABLE 4), states whether an memory object can escape to another or not. In another word, the escape order indicates whether a memory object may be accessed by dereferencing another memory object or not. Since memory objects are accessed via Load and Store instructions, a memory object can escape to another only via store instructions. For our example in FIG. 5B, we have {alloc_a, alloc_b} $\trianglelefteq$ {alloc_A, alloc_B}. By definition, the escape order is transitive and antisymmetric. Two memory objects are said to be in a cyclic escaping relation if the memory objects escape to each other.

TABLE 4

```
procedure COMPUTEESPSET(alloc_o)
    for each node P in pted(alloc_o) do
        if P is a store instruction then
            Let P' be the pointer P refers to
            if ptsTo(P') = Ø then
                esp(alloc_o) := {All memory objects}
            else
                esp(alloc_o) := esp(alloc_o) ∪ pts(P')
            end if
        end if
    end for
end procedure
```

In one or more embodiments of the invention, it is assumed that scalar memory objects with strong updates are not in a cyclic escaping relation. The assumption is often enforced by static type checking rules. Based on this assumption, precision can be guaranteed if the indirect flows for all scalar memory objects with strong updates are computed in escape order. Imprecision can only occur if some strong updates are not considered in computing the indirect flows of a memory object. For scalar memory object alloc_A, let S be the set of objects such that {∀alloc_o ∈ S|alloc_o$\trianglelefteq$ alloc_A}. The indirect flows of alloc_A are computed only if the indirect flows for all objects in S are computed. Thus the pointed-to-by set for alloc_A is completely computed since alloc_A can be referenced only via direct flows and indirect flows of memory objects in S. Hence all strong updates will be considered in computing the indirect flows of alloc_A, and the analysis is precise.

In programming languages such as C, arbitrary type castings theoretically can be written that may violate the assumption. If the assumption does not hold, precision can always be guaranteed by conservatively assuming that a store referring to a pointer with unknown points-to set will kill all other store instructions. In addition, unnecessary re-computation of indirect flows can be avoided by following the escape order hence the incompleteness problem can be efficiently solved.

If the memory object does escape to another object with uncomputed indirect references (i.e., the pointed-to-by set is not completely computed), the memory object is added to a wait list for later processing (Step 412). In other words, the wait list is configured to maintain a list of memory objects that are deferred from processing, where a memory object is moved from the wait list to the worklist when the indirect references have been computed for all of the objects that the memory object escapes to. If the memory object does not escape to another object with uncomputed indirect references (i.e., the pointed-to-by set is completely computed), the process proceeds to Step 414.

In Step 414, the value flow graph is updated with indirect references. With respect to strong updates, flow-sensitivity can be achieved in computing indirect flows by ensuring that a Store can flow to a Load only if it can reach the Load in the CFG without being killed. Compared to existing points-to analysis algorithms, the points-to information of pointer variables is not relied on to handle indirect references with pointers. Accordingly, points-to information does not need to be propagated along the CFG or def-use chains, where large points-to set often need to be propagated and expensive set operations are involved.

In one or more embodiments of the invention, because the value flow graph is dynamically updated during the analysis, the computed pointed-to-by information and points-to information may not be complete. As a result, indirect value flows may be incorrectly computed based on the incomplete information, leading to both inefficiency and imprecision.

Specifically, imprecision may occur due to missed strong updates. During the analysis, the value flow graph is updated by introducing indirect value flows from Store to Load instructions that refer to a same memory object. With incomplete pointed-to-by information of the memory object, some store instructions may not be considered in computing its indirect flows since we do not yet know whether the store instructions actually refer to the memory object. If the missed store instructions are strong updates, unnecessary value flows may be introduced into the VFG, making the analysis imprecise. For the example in FIG. 5B, if we are not aware that p also refers to alloc_a, the store instruction (store p, s2) in function swap will not be considered in computing the indirect flows of alloc_a. As a result, the analysis will wrongly conclude that (store t1, A) in bb0 can flow to (a2=load t1) in bb2 since both refer to the same pointer variable, although (store t1, A) will be killed by the call to function swap.

In addition, incompleteness may occur due to false strong updates. Some strong updates may be incorrectly applied where weak updates should be used instead. With incomplete points-to information, we may falsely assume that a store only refers to one memory object and kills all other stores to that object, resulting in incomplete results.

In one or more embodiment of the invention, the incompleteness is addressed by attempting to compute the indirect flows of a memory object only if its pointed-to-by set is complete as discussed above with respect to Step 412. This is achieved by following an escape order in computing indirect flows. Precision can be guaranteed if the escape order is enforced. Furthermore, we show that in practice there typically exists an escape order for scalar memory objects with strong updates and the analysis is precise if their indirect flows are computed in escape order.

The indirect flows of the memory object are computed by examining the set of Store and Load instructions that refer to the memory object using the pointed-to-by set. Specifically, indirect flows are computed by (1) handling inter-procedural indirect flows by determining whether a store can flow to a Load instruction across a function boundary or not and then (2) handling local flows by performing a sparse reachability analysis to every function where the object is referenced. An example algorithm for updating a value flow graph with indirect references is shown below in TABLE 5.

TABLE 5 procedure ComputeIndirectFlow(alloc_o)
  PreprocessGlobalFlow(alloc_o)
  for each function f where alloc_o is referenced do
    ComputeLocalFlow(f, alloc_o)
  end for
end procedure
procedure PreprocessGlobalFlow(alloc_o)
  for each inter-procedural flow arg → para of alloc_o do
    Let c be the callsite
    Let f be the callee function
    Introduce the following four instructions
      ref.arg = load arg      before callsite c
      store para, ref.arg     at the entry of function f
      ref.para = load para    at the exit of function f
      store arg, ref.para     after callsite c
  end for
end procedure
procedure ComputeLocalFlow(f, alloc_o)
  Let S be the set of store instructions in f that refer to alloc_o
  Let IDF(S) be the iterated dominance frontier of S
  Build the simplified CFG G of f as follows
    G := {S  IDF(S)}
    Add edge $S_1 \rightarrow S_2$ to G if
      $S_2$ is the dominance frontier of $S_1$ or
      $S_1$ is the most immediate dominator of $S_2$ in G
  Solve the following dataflow equation in G $$IN_K = \bigcup_{x \in pred(l)} OUT_x$$

$$OUT_k \begin{cases} GEN_k & \text{strong update} \\ GEN_k \cup IN_k & \text{otherwise} \end{cases}$$

where $GEN_k$ is the store instruction in k
  Let L be the set of load instructions in f that refer to alloc_o
  for each load instruction L in L do
    Let S be the most immediate dominator of L in G
    $OUT_S$ is the set of store instructions that can reach L
  end for
end procedure As shown in the procedure PreprocessGlobalFlow of TABLE 5, inter-procedural indirect flows are modeled as value flows between auxiliary variables introduced for objects passed into a function by reference. Global variables are handled by creating a local copy of a global variable at each function where the global variable is used and then processed in the same fashion. The procedure PreprocessGlobalFlow models inter-procedural indirect flows by translating passing by reference into passing by value. Specifically, for every inter-procedural value flow arg→ para of the memory object, we introduce two variables ref.arg and ref.para to represent dereferences of arg (argument) and para (parameter), respectively. The value flows between ref.arg and ref.para are enabled by the four instructions introduced for each inter-procedural value flow. As a result, inter-procedural indirect flows of alloc_o are modeled as value flows between the introduced variables.

The value flow edge (ref.arg=load arg)→ (store para, ref.arg) models all indirect flows of alloc_o from callsite c into function f. A store instruction S in the caller function can flow to a load L in f if (1) S can reach the callsite (i.e., S → (ref.arg=load arg)) and (2) L is reachable from the entry of f (i.e., (store para, ref.arg)→ L). Similarly, indirect flows returning from the callee function f to its caller function via dereferences of alloc_o are enabled by the flow edge (ref.para=load para)→ (store para, ref.para).

FIG. 5B shows an example SSA representation of source code (the source code is shown in FIG. 5A). In an SSA representation, all variables are defined exactly once and different definitions for the same variable in the original program are represented as distinct variables. In this case, if a variable is defined along two different paths, then at the join point in a corresponding CFG where the two paths merge, a phi instruction is introduced to represent the combinations of the definitions. SSA allows for sparse analysis and its benefits are well known to those skilled in the art (e.g., more efficient dataflow analysis by following the def-use chain of each variable, avoiding propagation of unnecessary information in the CFG, etc.). Those skilled in the art will appreciate that embodiments of the invention are not reliant upon SSA.

Figure 5C:
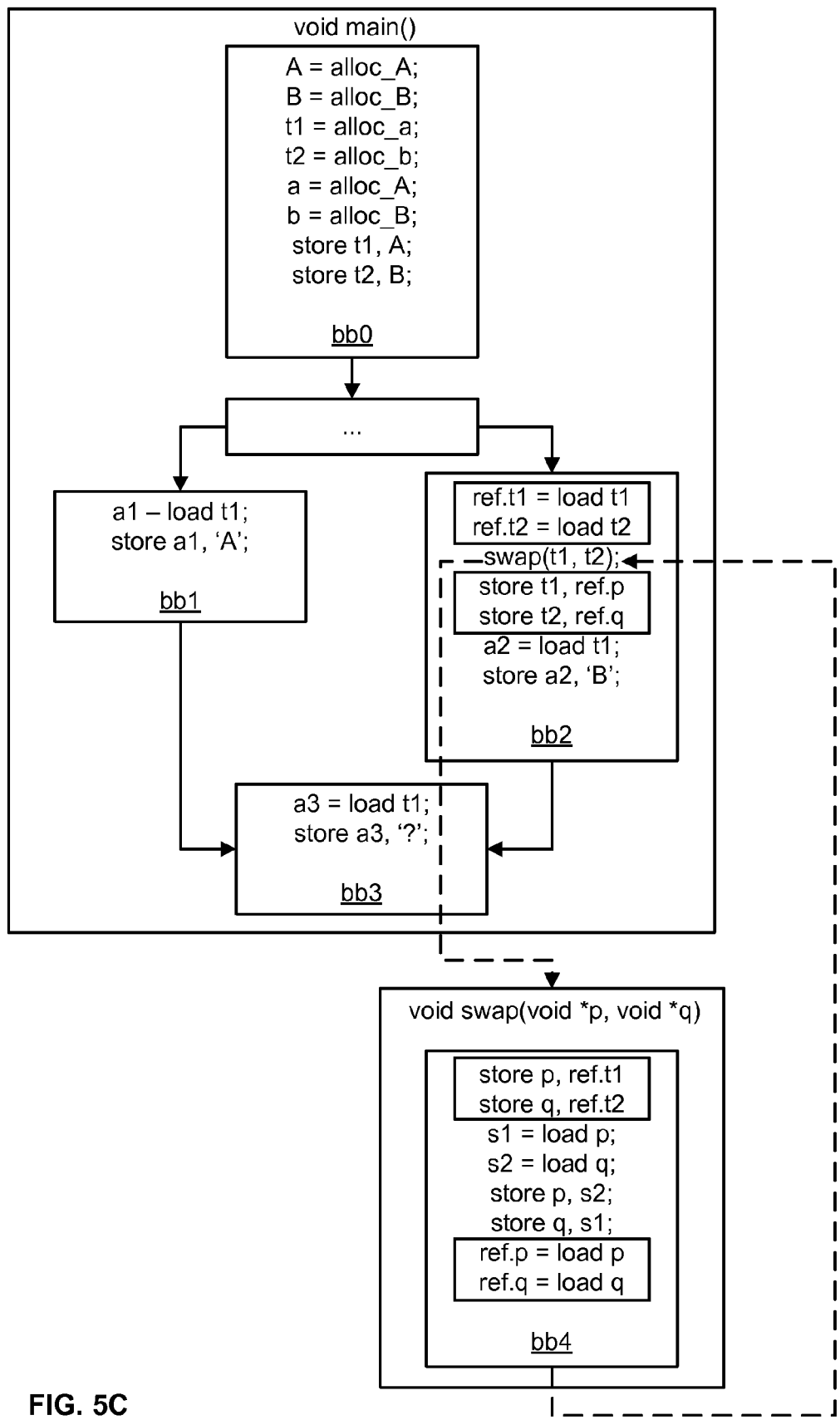
Figure 5D:
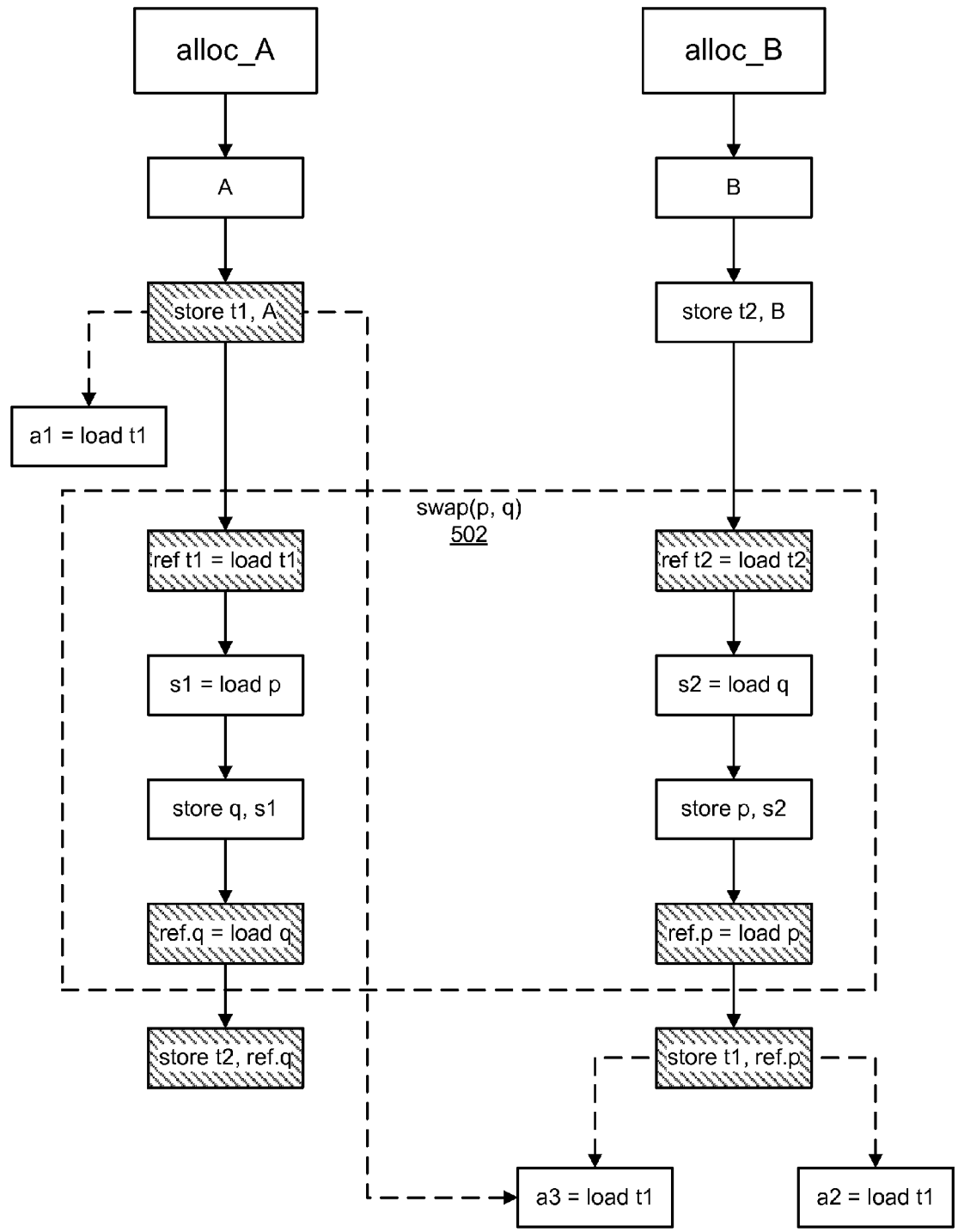

In the example of FIG. 5B, object alloc_a and alloc_b are passed into function swap at the callsite in bb2 via pointer t1 and t2, respectively. FIG. 5B shows two inter-procedural value flow edges: t1 → p, and t2 → q. As a result, eight instructions (four for each flow edge) are introduced as shown in FIG. 5C. The corresponding value flow graph is shown in FIG. 5D. For simplicity, only the value flows of alloc_A and alloc_B are presented. The portion of the value flow graph in function swap is shown in 502 of FIG. 5D. In this example, the function swap is connected with the value flow graph in the caller function main via the introduced auxiliary variables.

As shown in the procedure ComputeLocalFlow of TABLE 5, local indirect flows of object alloc_o are computed by applying a sparse reachability analysis in every function where alloc_o is referenced. It can be shown that a Store can reach a Load in the CFG only if the Load is dominated by the Store or one of the Store's iterated dominance frontiers. Accordingly, the analysis first builds a sparse graph G including only store instructions referring to alloc_o and their iterated dominance frontiers (first seven lines of ComputeLocalFlow). The dataflow equation is then efficiently solved in the sparse graph to compute the reachable store set (i.e., the set of store instructions that can reach an instruction) for G. The reachable store set of a Load instruction is computed by finding its most immediate dominator in G (last five lines of ComputeLocalFlow). Since the simplified graph G is very sparse and the reachable store set to be computed is in general very small with only local store instructions referring to alloc_o, the analysis is very efficient.

Figure 5F:
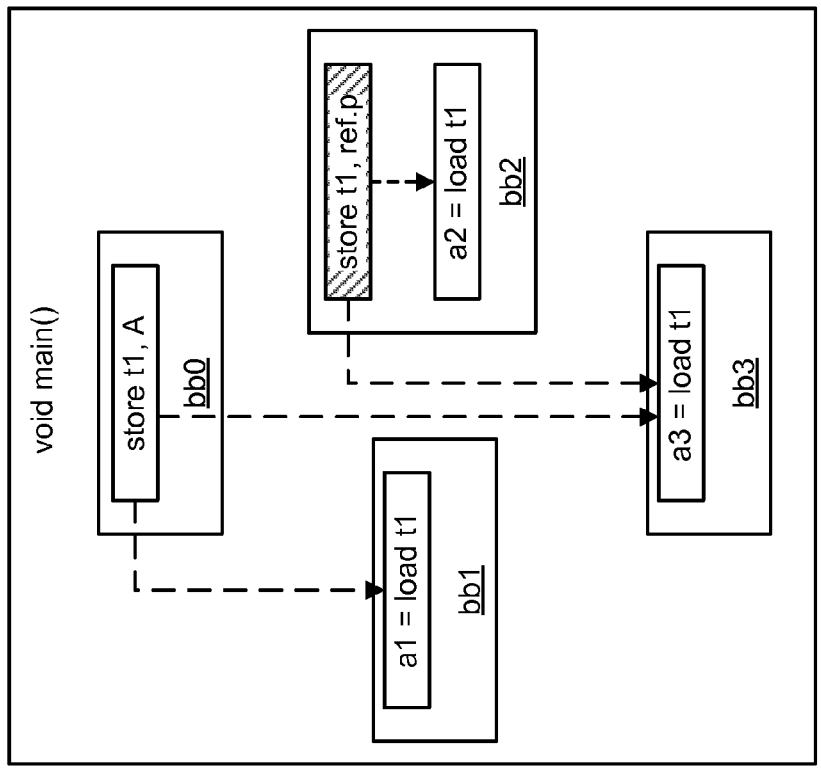
Figure 5E:
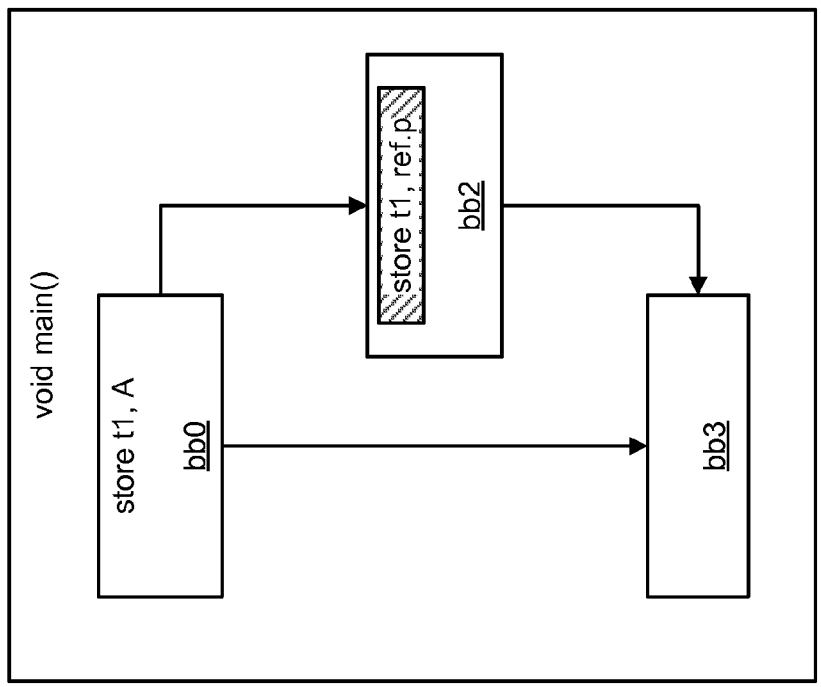

FIG. 5E shows the simplified CFG G when computing the local indirect flows of alloc_a in function main. In this example, there are two store instructions referring to alloc_a, (store t1, A) in bb0 and (store t1, ref.p) in bb2. The later is introduced in PreprocessGlobalFlow for inter-procedural indirect flows of alloc_a. The two store instructions and their iterated dominance frontier bb3 are included in G.

The local indirect flows of alloc_a are shown in FIG. 5F. As the only dominator in G, the Store in bb0 (store t1, A) flows to the Load (a1=load t1) in bb1. The store instruction (store t1, ref.p) in bb2 kills all its previous Stores and only it can reach the Load (a2=load t1) in the same block. The most immediate dominator of the Load (a3=load t1) in the simplified CFG is bb3. Thus, the Load (a3=load t1)'s reachable Store set is $OUT_{bb3}$, including both Store instructions in bb0 and bb2.

Referring to FIG. 4, in Step 416, the pointed-to-by set is updated in response to the updates to the value flow graph for the indirect flows of the memory object. Those skilled in the art will appreciate that if escape order is enforced, no processed object needs to be updated. Specifically, scalar objects with strong updates are never updated once their indirect flows are computed. In Step 418, a determination is made as to whether additional flow edges exist. If additional flow edges do exist, the process processed to Step 408 to process the next memory object. If no additional flow edges exist, the process proceeds to Step 420.

Referring to FIG. 4, in Step 420, the source code may be analyzed using the point-to sets and/or the pointed-to-by sets. Specifically, compiler optimizations, program comprehension, and/or error checking may be performed on the source code using the point-to sets. For example, the point-to sets may be used to identify null pointer exceptions or buffer overflows in the source code (e.g., using the points-to sets to analyze the flow of memory objects to a pointer variable to determine if the pointer variable is null at a point execution). In another example, the points-to set may be used to perform compiler optimizations such as, but not limited to, instruction scheduling, redundancy elimination, and speculative parallelization.

An example algorithm for generating a value flow graph as discussed above with respect to FIG. 4 is shown in TABLE 6.

TABLE 6

```
processedList := ∅
waitList := ∅
updateList := {All memory objects}
procedure ComputePointsToVFG
    Initialize VFG with direct value flows only
    while updateList ≠ ∅    waitList ≠ ∅ do
        for every object alloc_o in updateList do
            ComputePtedSet(alloc_o)
        end for
        for any pointer P that is no longer strong update do
            Move pts(P) to updateList
        end for
        for every object alloc_o in updateList do
            ComputeEspSet(alloc_o)
        end for
        updated := false
        toUpdateList := ∅
        for every object alloc_o in updateList do
            updateList := updateList \ {alloc_o}
            if esp(alloc_o)∩{updateList    waitList} ≠ ∅ then
                waitList := waitList    {alloc_o}
            else
                updated := true
                UpdateVFG(alloc_o, toUpdateList)
            end if
```

TABLE 6-continued

```
        end for
        if updated = false then
            for every non-scalar object alloc_o in waitList do
                updateList := updateList    {alloc_o}
                UpdateVFG(alloc_o, toUpdateList)
            end for
        end if
        Move toUpdateList to updateList
    end while
end procedure
procedure UpdateVFG(alloc_o, toUpdateList)
    ComputeIndirectFlow(alloc_o)
    for each indirect flow S → L of alloc_o do
        if S → L ∉ VFG then
            Add S → L to VFG
            toUpdateList := toUpdateList pts(S)
        end if
    end for
end procedure
```

In the example shown in TABLE 6 above, the ComputePointsToVFG procedure may correspond to Steps 400-420, and the UpdateVFG procedure may correspond to Steps 412-418. In the example algorithm, the value flow graph is denoted as VFG, the points-to set for each pointer variable is denoted as pts, and the pointed-to-by set for each memory object, alloc_o, is denoted as pted.

Figure 6:
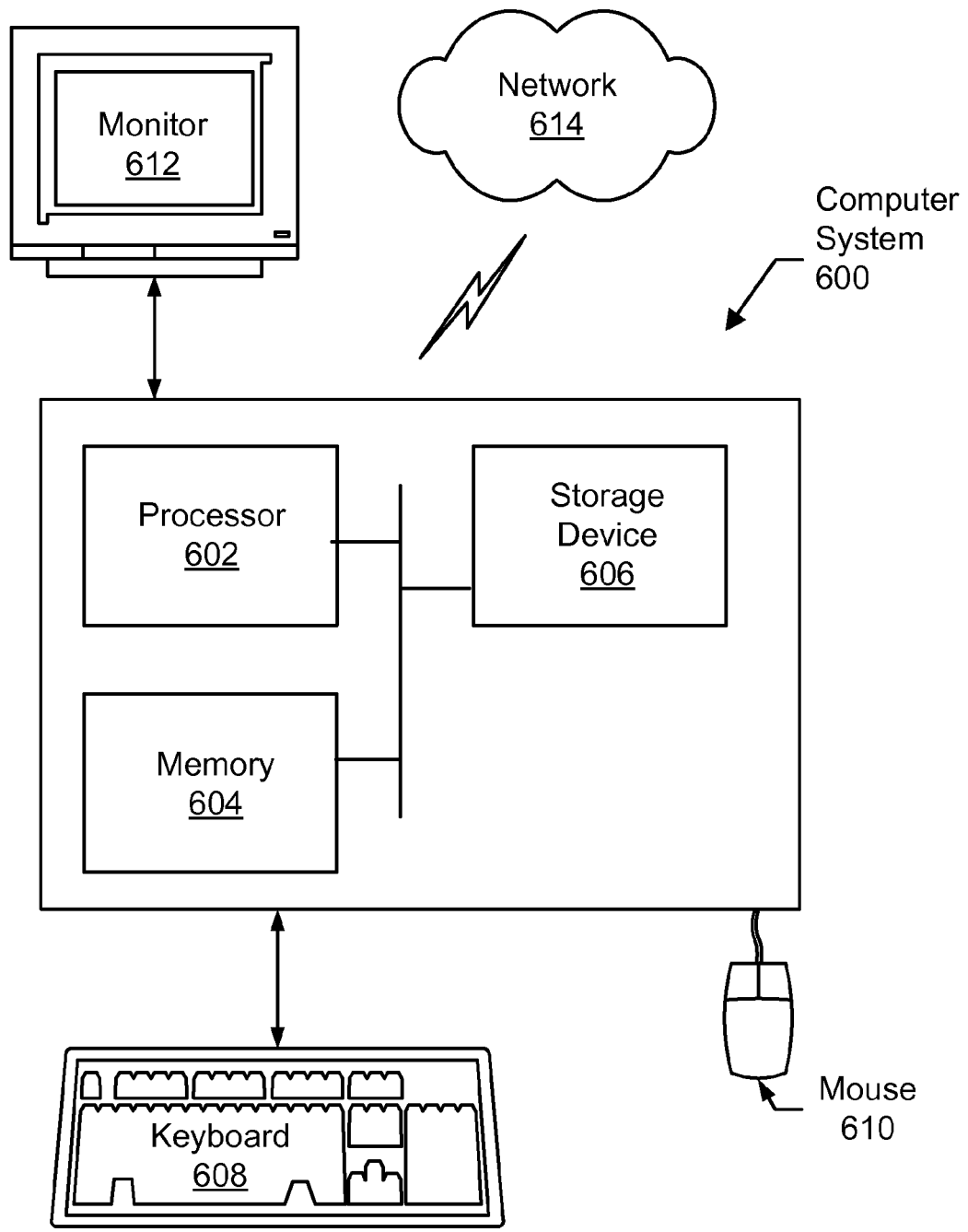
FIG. 6 shows a diagram of a computer system in accordance with one or more embodiments of the invention.

Embodiments of the invention may be implemented on virtually any type of computer regardless of the platform being used. For example, as shown in FIG. 6, a computer system (600) includes one or more processor(s) (602) (e.g., an integrated circuit, central processing unit, or other hardware processor), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer system (600) may also include input means, such as a keyboard (608), a mouse (610), or a microphone (not shown). Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (600) includes at least the minimal processing, input, and/or output means necessary to particularly practice embodiments of the invention.

Further, those skilled in the art will appreciate that one or more elements of the aforementioned computer system (600) may be located at a remote location and connected to the other elements over a network (614). Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing points-to analysis by generating a value flow graph for source code comprising:
    initializing the value flow graph comprising a plurality of memory objects and a set of edges based on Base and Assignment instructions, wherein the set of edges represents inclusion constraints between the plurality of memory objects and a plurality of pointer variables;
    determining, using the value flow graph, a pointed-to-by set comprising at least one pointer variable of the plurality of pointer variables that are reachable from one of the plurality of memory objects;
    updating the value flow graph by introducing a flow edge based on an indirect reference, wherein the flow edge is related to a memory object of the plurality of memory objects that is added to a working list, wherein updating the value flow graph terminates when no new flow edges can be introduced into the value flow graph;
    updating the pointed-to-by set based on the memory object in the working list; and
    analyzing the source code using the pointed-to-by set.

2. The method of claim 1, wherein determining the pointed-to-by set further comprises performing a depth first traversal of the value flow graph.

3. The method of claim 1, wherein the flow edge is from a Store instruction to a Load instruction, and wherein updating the value flow graph further comprises:
    introducing the flow edge if both the Store instruction and the Load instruction refer to the at least one pointer variable in the pointed-to-by set; and
    adding the memory object of the plurality of memory objects to the working list.

4. The method of claim 3, wherein updating the value flow graph further comprises:
    determining a points-to set comprising the memory object using the pointed-to-by set, wherein the points-to set comprises all memory objects that may be pointed to by the at least one pointer variable; and
    identifying the memory object for adding to the working list using the points-to set.

5. The method of claim 1, wherein the flow edge is from a Store instruction to a Load instruction, and wherein updating the value flow graph further comprises:
    introducing the flow edge to the value flow graph while ensuring that the Store instruction can flow to the Load instruction without being killed by another Load instruction.

6. The method of claim 5, further comprising:
    for each inter-procedural value flow of the memory object, introducing a ref.arg variable representing a dereference of an argument of a procedure and a ref.para variable representing a dereference of a parameter of the procedure,
    wherein the flow edge is modeled as a value flow between ref.arg and ref.para.

7. The method of claim 5, wherein the indirect reference is a local indirect flow, and wherein updating the value flow graph further comprises:
    building a sparse graph including Store instructions referring to the memory object and iterated dominance frontiers of the Store instructions; and
    determining a set of the Store instructions of the sparse graph by finding a most immediate dominator in the sparse graph for each of the set of the Store instructions, wherein each of the set of the Store instructions can reach the Load instruction.

8. The method of claim 5, further comprising:
    determining an escape set comprising each of the plurality of memory objects that the one of the plurality of memory objects escapes to; and
    in response to determining that the one of the plurality of memory objects escapes to a second object of the plurality of memory objects with uncomputed indirect flows, adding the one of the plurality of memory objects to a wait list,
    wherein updating the value flow graph is performed after determining that the second object of the plurality of memory objects has no uncomputed indirect flows.

9. The method of claim 1, wherein the pointed-to-by set is determined and updated for each of the plurality of memory objects.

10. A system for performing points-to analysis by generating a value flow graph for source code comprising:
    at least one processor;
    a direct reference module configured to be executed on the at least one processor, the direct reference module when executed causing the at least one processor to:
        initialize the value flow graph comprising a plurality of memory objects and a set of edges based on Base and Assignment instructions, wherein the set of edges represents inclusion constraints between the plurality of memory objects and a plurality of pointer variables; and
        determine, using the value flow graph, a pointed-to-by set comprising at least one of the plurality of pointer variables that are reachable from one of the plurality of memory objects;
    an indirect reference module configured to be executed on the at least one processor, the indirect reference module when executed causing the at least one processor to:
        update the value flow graph by introducing a flow edge based on an indirect reference, wherein the flow edge is related to a memory object of the plurality of memory objects;
        terminate updating the value flow graph when no new flow edges can be introduced into the value flow graph;
        update the pointed-to-by set based on the flow edge; and
        determine a points-to set comprising the memory object using the pointed-to-by set, wherein the points-to set comprises all memory objects that may be pointed to by the at least one of the plurality of pointer variables; and
    an analysis module configured to be executed on the at least one processor, the analysis module when executed causing the at least one processor to perform analysis of the source code using the points-to set.

11. The system of claim 10, wherein the direct reference module is further configured to determine the pointed-to-by set by performing a depth first traversal of the value flow graph.

12. The system of claim 10, wherein the flow edge is from a Store instruction to a Load instruction, and wherein the indirect reference module is further configured to:
   introduce the flow edge if both the Store instruction and the Load instruction refer to the at least one of the plurality of pointer variables in the pointed-to-by set; and
   identify the memory object for adding to a working list using the points-to set.

13. The system of claim 10, wherein the flow edge is from a Store instruction to a Load instruction, and wherein updating the value flow graph further comprises:
   introducing the flow edge to the value flow graph while ensuring that the Store instruction can flow to the Load instruction without being killed by another Load instruction.

14. The system of claim 13, wherein the indirect reference module is further configured to:
   determine an escape set comprising each of the plurality of memory objects that the one of the plurality of memory objects escapes to; and
   in response to determining that the one of the plurality of memory objects escapes to a second object of the plurality of memory objects with uncomputed indirect flows, add the one of the plurality of memory objects to a wait list,
   wherein the indirect reference module updates the value flow graph after determining that the second object of the plurality of memory objects has no uncomputed indirect flows.

15. A non-transitory computer readable medium storing instructions for performing points-to analysis by generating a value flow graph for source code, the instructions comprising functionality to:
   initialize the value flow graph comprising a plurality of memory objects and a set of edges based on Base and Assignment instructions, wherein the set of edges represents inclusion constraints between the plurality of memory objects and a plurality of pointer variables;
   determine, using the value flow graph, a pointed-to-by set comprising at least one of the plurality of pointer variables that are reachable from one of the plurality of memory objects;
   determine that a Store instruction and a Load instruction of an indirect reference both refer to the at least one of the plurality of pointer variables;
   update the value flow graph by introducing a flow edge from the Store instruction to the Load instruction, wherein the flow edge is related to a memory object of the plurality of memory objects that is added to a working list;
   terminate updating the value flow graph when no new flow edges can be introduced into the value flow graph;
   update the pointed-to-by set based on the memory object in the working list; and
   analyze the source code using the pointed-to-by set.

16. The non-transitory computer readable medium of claim 15, wherein the instructions for determining the pointed-to-by set further comprise functionality to perform a depth first traversal of the value flow graph.

17. The non-transitory computer readable medium of claim 15, wherein the flow edge is from a Store instruction to a Load instruction, and wherein updating the value flow graph further comprises:
   introducing the flow edge to the value flow graph while ensuring that the Store instruction can flow to the Load instruction without being killed by another Load instruction.

18. The non-transitory computer readable medium of claim 17, wherein the instructions further comprise functionality to:
   determine an escape set comprising each of the plurality of memory objects that the one of the plurality of memory objects escapes to; and
   in response to determining that the one of the plurality of memory objects escapes to a second object of the plurality of memory objects with uncomputed indirect flows, add the one of the plurality of memory objects to a wait list,
   wherein the instructions for updating the value flow graph are executed after determining that the second object of the plurality of memory objects has no uncomputed indirect flows.

19. The non-transitory computer readable medium of claim 15, wherein the pointed-to-by set is determined and updated for each of the plurality of memory objects.

* * * * *

UNITED STATES PATENT AND TRADEMARK OFFICE
CERTIFICATE OF CORRECTION

PATENT NO. : 8,473,927 B2
APPLICATION NO. : 13/117058
DATED : June 25, 2013
INVENTOR(S) : Li et al.

It is certified that error appears in the above-identified patent and that said Letters Patent is hereby corrected as shown below:

On title page, column 2, under Other Publications, line 15, delete "(TOESM)," and insert -- (TOSEM), --, therefor.

In the Specification

In column 11, line 55-56, delete "$IN_K = \bigcup_{x \in pred(l)} OUT_x$" and insert -- $IN_K = \bigcup_{x \in pred(k)} OUT_x$ --, therefor.

Signed and Sealed this
Twenty-second Day of October, 2013

Teresa Stanek Rea
*Deputy Director of the United States Patent and Trademark Office*